2,937,192
17α-METHYL-17β-HYDROXYESTRAN-3-ONE

Frank B. Colton, Chicago, Ill., assignor to G. D. Searle & Co., Chicago, Ill., a corporation of Delaware No Drawing. Application March 31, 1958
Serial No. 724,886

1 Claim. (Cl. 260—397.4)

The present invention relates to a new hormonal agent, and, more particularly to 17α-methyl-17β-hydroxyestran-3-one. This product is a hypotensive agent and a desoxycorticosterone inhibitor. It inhibits not only the hypertensive but also the sodium retaining effects of that mineralocorticoid hormone. It is unlike its higher homologs, e.g. the 17α-propyl-17β-hydroxyestran-3-one, in being a potent anabolic agent and in lacking progestational activity. Its hypotensive activity was surprising in view of the inactivity of such related compounds as 17-methyl-19-nortestosterone and 17β-hydroxyestran-3-one. The compound has minimal androgenic and other undesirable side effects.

The preparation can be conveniently accomplished by the following procedure. To a solution of 1 gram of 17-methyl-19-nortestosterone in 50 cc. of dioxane are added 0.2 grams of a 5% palladium-on-charcoal catalyst. The mixture is maintained at room temperature in a hydrogen atmosphere until one mole of hydrogen has been absorbed. The solution is then filtered. The filtrate is concentrated under vacuum and the residue is recrystallized from a mixture of acetone and petroleum ether to yield 17α-methyl-17β-hydroxy-5β-estran-3-one of the structural formula

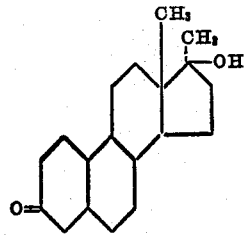

The compound melts at about 136.5–137.5° C.

To isolate the 5β-isomer, the filtrate from the crystallization is taken to dryness and the residue is taken up in a solution consisting of 50% petroleum ether and 50% of benzene and thus applied to a chromatography column containing 15% magnesia and 85% silica gel.

The column is eluted with a benzene solution containing 50% petroleum ether and there is thus eluted an additional quantity of the foregoing product. Elution with pure benzene yields a mixture of the 5α- and 5β-isomers. Further elusion with a solution containing 5% ether in benzene yields the pure 17α-methyl-17β-hydroxy-5α-estran-3-one which melts at about 145–147° C.

The present invention is a continuation-in-part of copending application Serial No. 630,042, filed December 24, 1956, now abandoned.

What is claimed is:
A compound having the formula:

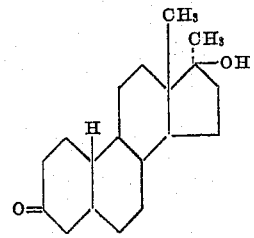

References Cited in the file of this patent
UNITED STATES PATENTS

| | | |
|---|---|---|
| 2,308,835 | Ruzicka et al. | Jan. 19, 1943 |
| 2,845,381 | Tindall | July 29, 1958 |